United States Patent [19]
Yoshida

[11] Patent Number: 6,008,913
[45] Date of Patent: *Dec. 28, 1999

[54] IMAGE PROCESSING APPARATUS HAVING THE ABILITY TO TRANSMIT RECORDABLE INFORMATION AT THE RECEIVER

[75] Inventor: Takehiro Yoshida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/895,571

[22] Filed: Jul. 16, 1997

Related U.S. Application Data

[60] Continuation of application No. 08/478,441, Jun. 7, 1995, abandoned, which is a division of application No. 08/081,147, Jun. 25, 1993, Pat. No. 5,638,192.

[30] Foreign Application Priority Data

Jun. 29, 1992 [JP] Japan ................................. 4-196326

[51] Int. Cl.$^6$ ..................................................... H04N 1/46
[52] U.S. Cl. .......................... 358/529; 358/501; 358/296
[58] Field of Search .................................... 395/107, 109, 395/112–114; 358/500, 501–504, 529, 530, 296, 434–436, 438, 439; H04N 1/46

[56] References Cited

U.S. PATENT DOCUMENTS

| | | | |
|---|---|---|---|
| 4,369,461 | 1/1983 | Tamura | 358/75 |
| 4,805,013 | 2/1989 | Dei et al. | 358/80 |
| 4,862,254 | 8/1989 | Takada | 358/500 |
| 5,138,672 | 8/1992 | Hirabayashi et al. | 382/54 |
| 5,159,468 | 10/1992 | Yoshida et al. | 358/451 |
| 5,251,020 | 10/1993 | Sugiyama | 358/500 |
| 5,349,450 | 9/1994 | Yoshioka et al. | 358/500 |
| 5,357,347 | 10/1994 | Hirose et al. | 358/501 |
| 5,361,143 | 11/1994 | Nakayama et al. | 358/500 |
| 5,361,144 | 11/1994 | Sugiura | 358/500 |
| 5,363,219 | 11/1994 | Yoshida | 358/539 |
| 5,392,133 | 2/1995 | Nakajima | 358/500 |
| 5,485,283 | 1/1996 | Kaneko | 358/518 |
| 5,579,130 | 11/1996 | Sakai et al. | 358/501 |
| 5,581,374 | 12/1996 | Shoji | 358/500 |
| 5,896,207 | 4/1999 | Tomida | 358/529 |

FOREIGN PATENT DOCUMENTS

| | | | |
|---|---|---|---|
| 0446008 | 9/1991 | European Pat. Off. | H04N 1/46 |
| 3802736 | 8/1988 | Germany | H04N 1/46 |
| 63-278469 | 11/1988 | Japan | H04N 1/46 |

OTHER PUBLICATIONS

IBM Technical Disclosure Bulletin vol. 31, No. 3, Aug., 1988, New York, US, pp. 216–229, XP112859, No Author, "Printing a Color Image Using a Black and White Printer", p. 227, line 10–line 30, Figures 1, 16–18.

IBM Technical Disclosure Bulletin "Printing A Color Image Using A Black & White Printer" Aug. 1988, pp. 216–229.

*Primary Examiner*—Kim Yen Vu
*Attorney, Agent, or Firm*—Fitzpatrick, Cella, Harper & Scinto

[57] ABSTRACT

An image processing apparatus which converts a color region in an input color image into predetermined images corresponding to colors. The apparatus has a discriminator for discriminating the colors in the input color image, a converter for converting the color regions in the color image into the predetermined images corresponding to the colors discriminated by the discriminator, and a generator for generating the predetermined images and character images representing the colors corresponding to the predetermined images.

11 Claims, 8 Drawing Sheets

RED

BLUE

GREEN

PINK

YELLOW

PURPLE

IMAGE PROCESSING APPARATUS HAVING THE ABILITY TO TRANSMIT RECORDABLE INFORMATION AT THE RECEIVER

This application is a continuation of application Ser. No. 08/478,441, filed Jun. 7, 1995, now abandoned which is a divisional of application Ser. No. 08/081,147, filed Jun. 25, 1993, issued as U.S. Pat. No. 5,638,192 on Jun. 10, 1997.

BACKGROUND OF THE INVENTION

1. Field of the Invention

The present invention relates to an image processing apparatus for converting a color region in an input color image into a predetermined image corresponding to the color.

2. Related Background Art

Conventionally, a facsimile apparatus capable of identifying a plurality of colors from each other, and reading these colors, transmits color information if a receiving facsimile apparatus can record a plurality of colors. However, if a receiving facsimile apparatus can only record a single color (e.g., black) (to be referred to as a monochrome facsimile apparatus hereinafter), the facsimile apparatus transmits binary information reflecting only the lightness of the read color information.

For this reason, when color original information is transmitted to a monochrome facsimile apparatus, the receiving apparatus cannot identify colors even though the transmitting apparatus faithfully reads a color image on a color original.

Figure 8:
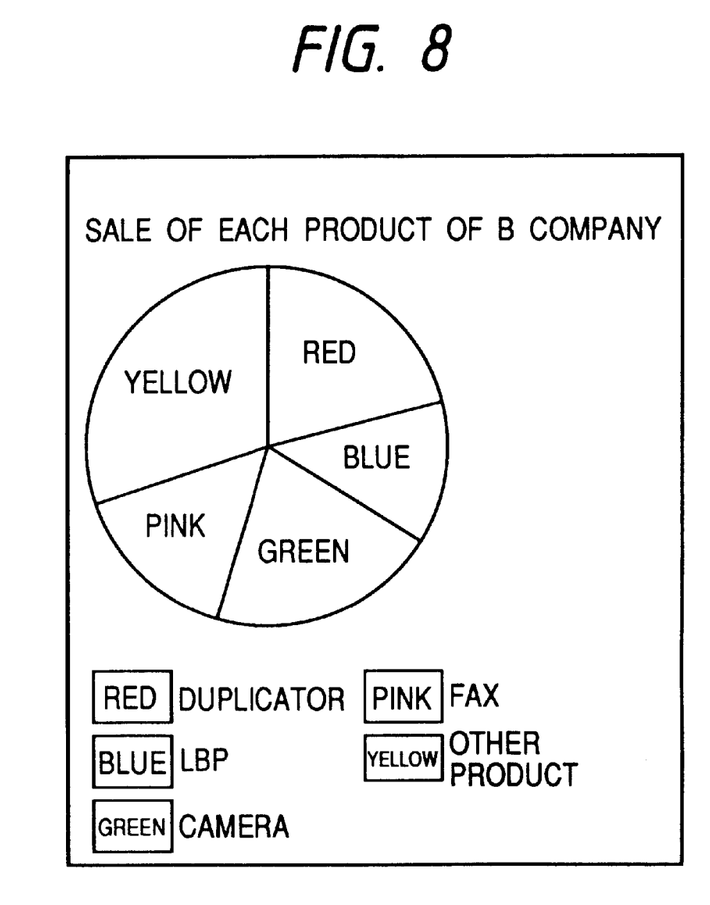
FIG. 8 is a graph showing an original including color images.
Figure 9:
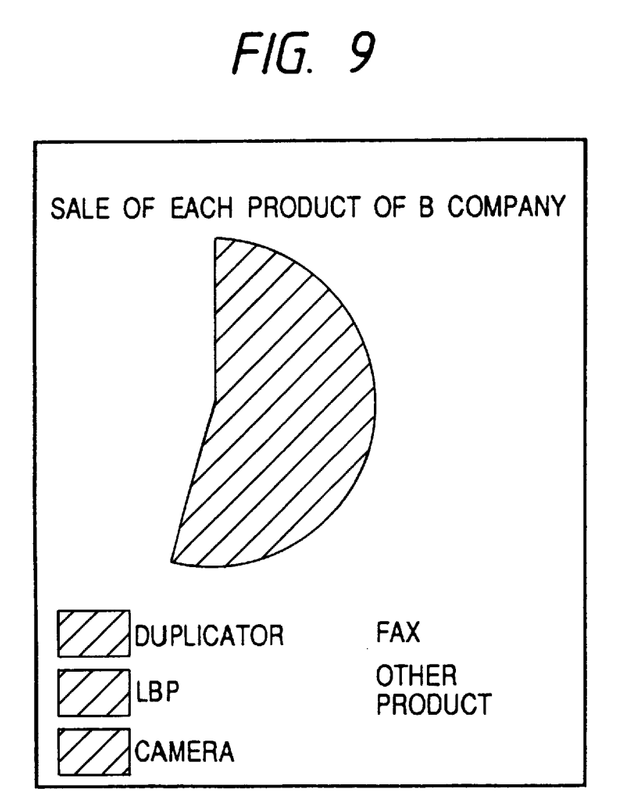
FIG. 9 is a graph showing an image recorded according to a prior art technique.
Figure 10:
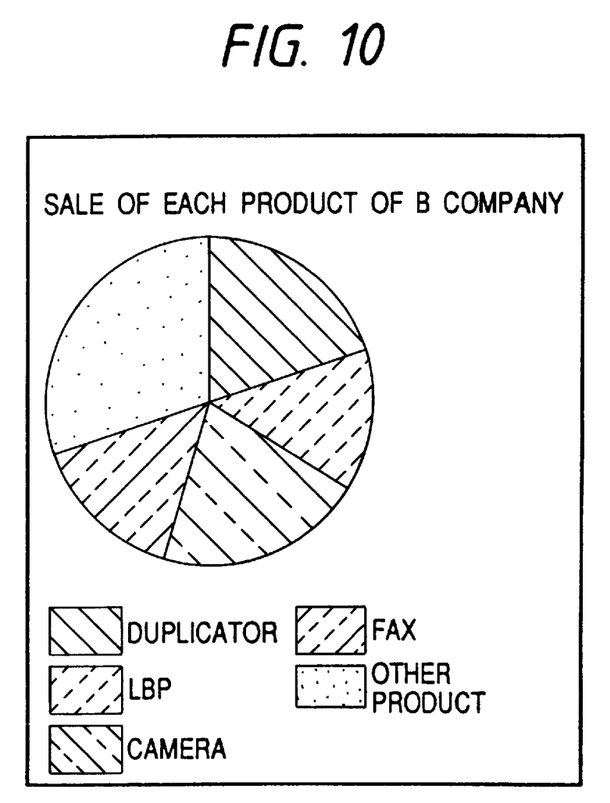
FIG. 10 is a graph showing an image obtained by converting color images shown in FIG. 8 into corresponding black/white binary patterns according to the prior art technique.

For example, assume that a color original, on which an upper circular graph is classified by five colors, i.e., red, blue, green, pink, and yellow, the five colors used in the circular graph are actually presented in a lower comment portion, and item names (product names in this case) corresponding to these colors are added to the colors, as shown in FIG. 8, is transmitted to a monochrome facsimile apparatus. In the case of the color original shown in FIG. 8, the receiving apparatus records red, blue, and green as black since they have low lightness, and records pink and yellow as white since they have high lightness, as shown in, e.g., FIG. 9. Therefore, although a group of red, blue, and green, and a group of pink and yellow can be discriminated from each other, red, blue and green, and pink and yellow in these groups cannot be distinguished from each other. As a result, information of the circular graph cannot be correctly recognized.

When the color original shown in FIG. 8 is transmitted to the monochrome facsimile apparatus in a halftone mode, since the same color information in the circular graph and the comment of the graph is recorded by a single tone pattern, the correspondence between the circular graph and the comment portion can be read, and information of the circular graph may be correctly recognized.

Figure 11:
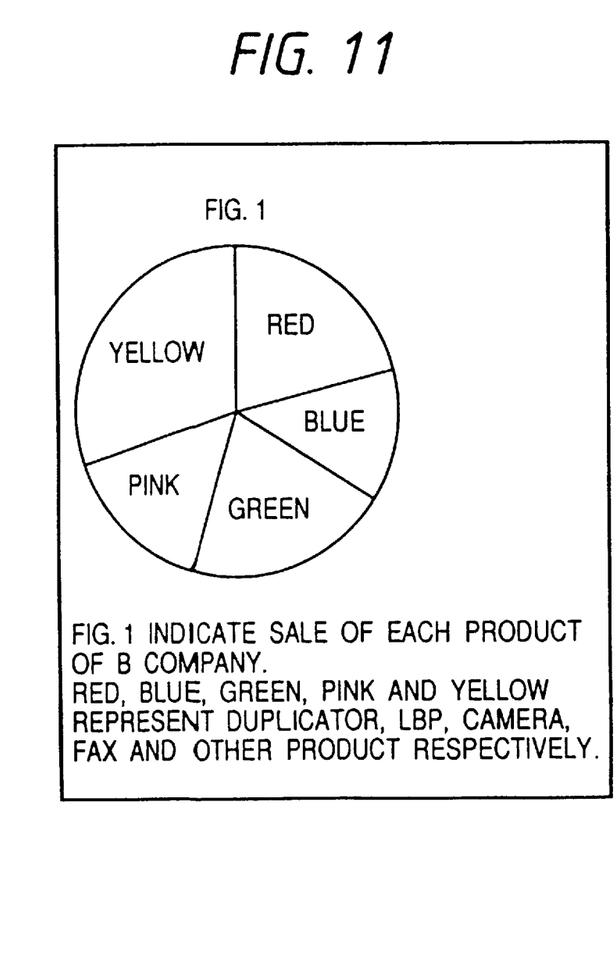
FIG. 11 is a graph view showing an original including color images.
Figure 12:
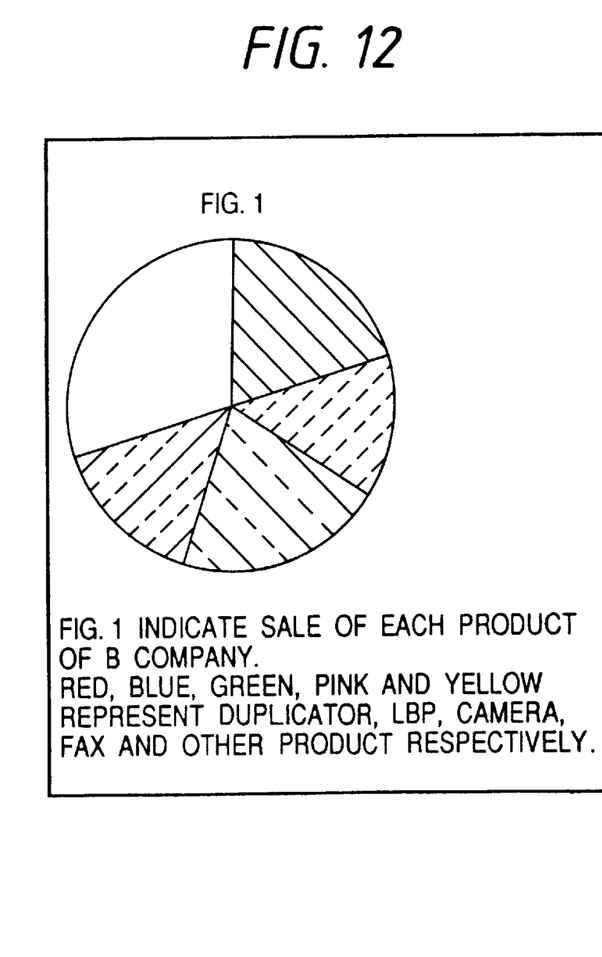
FIG. 12 is a graph view showing an image obtained by converting color images shown in FIG. 11 into corresponding black/white binary patterns according to the prior art technique.

However, when a color original, on which the comment of the graph in FIG. 8 is made by a text, as shown in FIG. 11, is transmitted in the halftone mode, the receiving apparatus records the information, as shown in FIG. 12. For this reason, even when the comment text includes color names, the correspondence between the colors and the tone patterns in the circular graph cannot be determined, and information of the circular graph cannot be correctly recognized.

The above-mentioned problems occur not only when color information is transmitted to a monochrome facsimile apparatus but also when a facsimile apparatus which can read seven colors, i.e., black, red, blue, green, pink, yellow, and purple transmits information including blue, green, pink, yellow, and purple to a facsimile apparatus which can record two colors, i.e., black and white.

SUMMARY OF THE INVENTION

It is an object of the present invention to provide an image processing apparatus which can solve the above-mentioned problems.

It is another object of the present invention to provide an image processing apparatus for outputting an image from which a correspondence between colors and predetermined images can be easily determined even when color regions in a color image are converted into predetermined images corresponding to the colors.

Other objects and features of the present invention will become apparent from the following specification and the accompanying drawings.

DETAILED DESCRIPTION OF THE PREFERRED EMBODIMENTS

Figure 1:
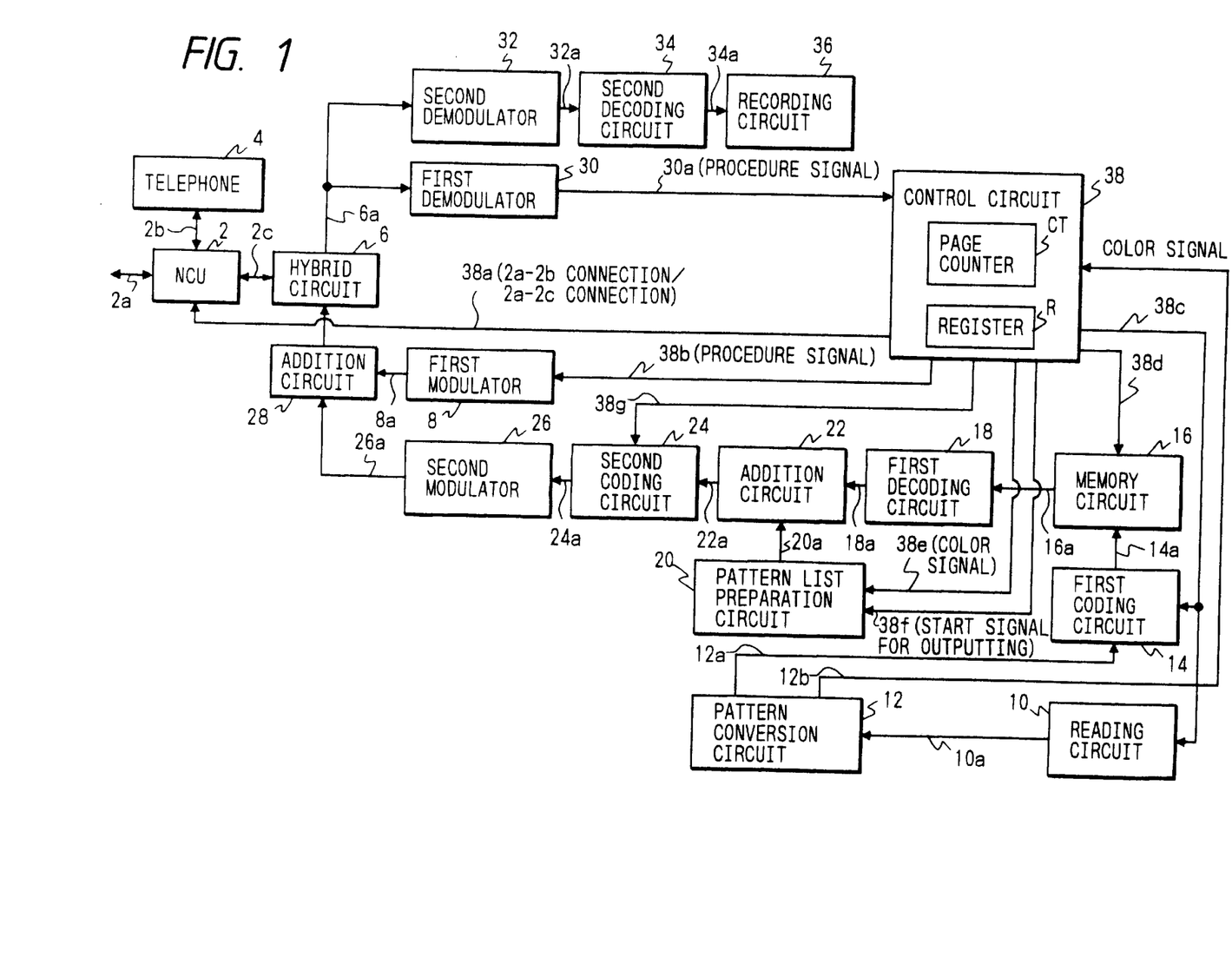
FIG. 1 is a block diagram showing a facsimile apparatus according to an embodiment of the present invention.

FIG. 1 is a schematic block diagram showing a facsimile apparatus according to an embodiment of the present invention. This facsimile apparatus transmits/receives a still image under the control of a control circuit 38.

An NCU (Network Control Unit) 2 makes a connection between a telephone line 2a and a telephone set 4, a connection between the telephone line 2a and a hybrid circuit 6, a holding operation of a loop, and the like so as to perform data transmission via a telephone switching network. For example, upon reception of a "0"-level signal from the control circuit 38 via a signal line 38a, the NCU 2 connects the telephone line 2a and a signal line 2b to set the telephone set 4 in a communication ready state; upon reception of a "1"-level signal, the NCU 2 connects the telephone line 2a and a signal line 2c to set the facsimile apparatus main body in a communication ready state. Note that the telephone line 2a is normally connected to the telephone set 4.

The hybrid circuit 6 is a circuit for separating transmission system signals and reception system signals.

More specifically, upon reception of a transmission signal via a signal line 28a, the hybrid circuit 6 transmits the transmission signal via the signal line 2c, the NCU 2, and the telephone line 2a; upon reception of a reception signal via the telephone line 2a, the NCU 2, and the signal line 2c, the hybrid circuit 6 fetches the reception signal in a reception system via a signal line 6a.

A first modulator 8 modulates various transmission control procedure signals output from the control circuit 38 via a signal line 38b in accordance with the CCITT recommendation V21 standard, and outputs the modulated signal to an addition circuit 28 via a signal line 8a.

A reading circuit 10 comprises a scanning optical system such as a halogen lamp, an imaging system such as a CCD color image sensor, or the like, and can read color image information from an original to be transmitted while color-separating the color image into seven colors, i.e., black, red, blue, green, pink, yellow, and purple. In this case, the reading circuit 10 sequentially reads the color image in units of lines in the main scanning direction on the basis of a control signal output from the control circuit 38 via a signal line 38c, and outputs read information to a pattern conversion circuit 12 via a signal line 10a.

Figure 2:
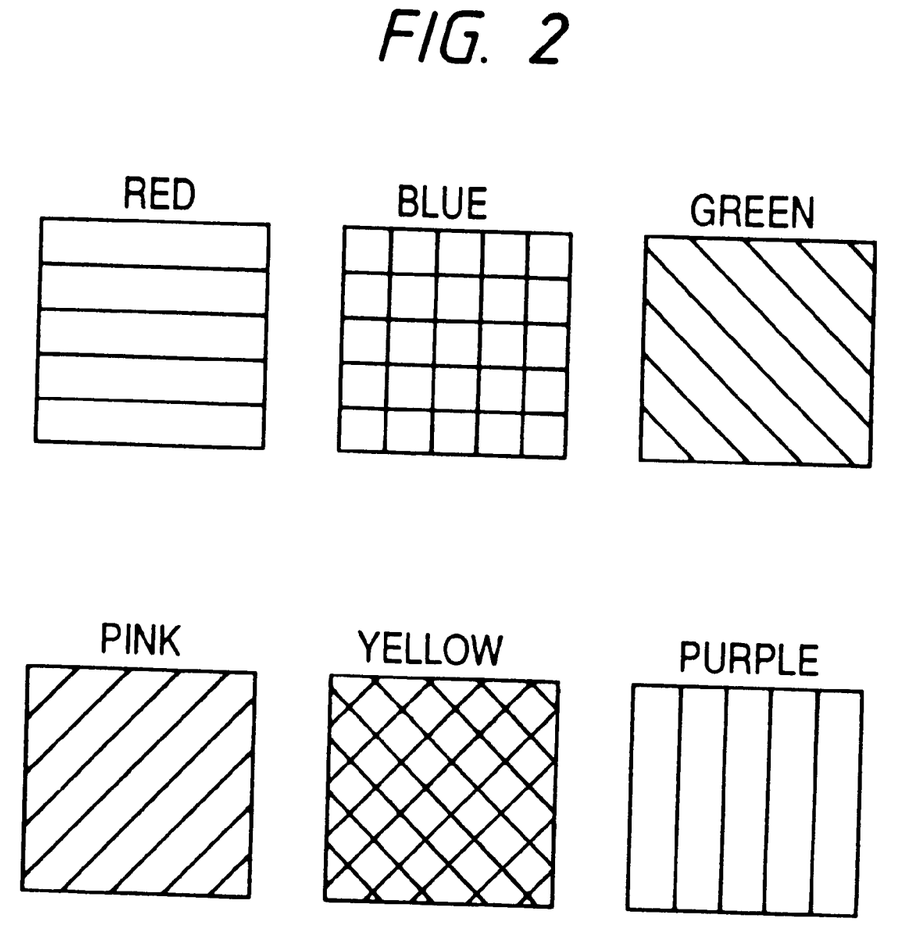
FIG. 2 is a view showing black/white binary patterns corresponding to colors.

The pattern conversion circuit 12 detects colors included in each line from color image information output in units of lines from the reading circuit 10. The circuit 12 outputs black image information without any conversion, converts colors other than black (such colors will be referred to as "colors" hereinafter) into black/white binary patterns in accordance with the format shown in FIG. 2, and outputs the converted patterns to a first coding circuit 14 via a signal line 12a. The pattern conversion circuit 12 also outputs signals of the detected colors to the control circuit 38 via a signal line 12b. In this case, when the circuit 12 does not detect colors, i.e., detects only white and black, it outputs a signal "0"; when the circuit 12 detects red, blue, green, pink, yellow, and purple, it outputs signals "1", "2", "3", "4", "5", and "6", respectively.

The first coding circuit 14 receives image data output from the pattern conversion circuit 12 on the basis of a control signal output from the control circuit 38 via the signal line 38c, encodes the received image data according to an MR method (Modified Read method; a two-dimensional coding method) of K=8, and outputs the encoded image data to a memory circuit 16 via a signal line 14a.

The memory circuit 16 stores image data encoded by the first coding circuit 14 on the basis of a write signal output from the control circuit 38 via a signal line 38d. The memory circuit 16 reads out the stored image data on the basis of a read-out signal output from the control circuit 38 via the signal line 38d, and outputs the readout image data to a first decoding circuit 18 via a signal line 16a.

The first decoding circuit 18 decodes the encoded image data from the memory circuit 16, and outputs the decoded image data to an addition circuit 22 via a signal line 18a.

A pattern list preparation circuit 20 prepares a list of patterns (FIG. 2) corresponding to detected colors and color names on the basis of detected color signals output from the control circuit 38 via a signal line 38e. The circuit 20 outputs image information of the list to the addition circuit 22 via a signal line 20a on the basis of a start signal for outputting from the control circuit 38 via a signal line 38f.

The addition circuit 22 synthesizes image data from the first decoding circuit 18 and image information of the list from the pattern list preparation circuit 20, and outputs synthesized data to a second coding circuit 24 via a signal line 22a.

The second coding circuit 24 encodes the synthesized data output from the addition circuit 22, and outputs the encoded data to a second modulator 26 via a signal line 24a. In this case, the second coding circuit 24 performs coding according to a coding method designated by the control circuit 38 via a signal line 38g, i.e., an MHC method (Modified Huffman Code method: one-dimensional coding method) or an MR method (Modified Read method: two-dimensional coding method). Also, the second coding circuit 24 reduces transmission data or perform line density conversion in accordance with a recording sheet size of a transmission destination.

The second modulator 26 is a modulator for performing modulation on the basis of the CCITT recommendation V27ter (differential phase modulation) standard or V29 (orthogonal modulation) standard. The modulator 26 modulates the encoded synthesized data from the second coding circuit 24, and outputs the modulated data to the addition circuit 28 via a signal line 26a.

The addition circuit 28 adds the modulated synthesized data from the second modulator 26 and the transmission control procedure signals from the first modulator 8, and outputs the sum data to the hybrid circuit 6 via the signal line 28a.

A first demodulator 30 is a demodulator for performing demodulation on the basis of the CCITT recommendation V21 standard. The demodulator 30 demodulates the transmission control procedure signals received via the hybrid circuit 6, and outputs the demodulated signals to the control circuit 38 via a signal line 30a.

A second demodulator 32 is a demodulator for demodulating data modulated based on the CCITT recommendation V27ter (differential phase modulation) standard or V29 (orthogonal modulation) standard. The demodulator 32 demodulates image data received from the hybrid circuit 6 and outputs the demodulated data to a second decoding circuit 34 via a signal line 32a.

The second decoding circuit 34 decodes image data demodulated by the second demodulator 32 and encoded by the MHC or MR method in the transmitting apparatus, and outputs the decoded data to a recording circuit 36 via a signal line 34a.

The recording circuit 36 sequentially records the decoded image data from the second decoding circuit 34 in units of lines. Note that the recording circuit 36 can be either one of a circuit capable of recording a single color (e.g., black) or a circuit capable of recording a plurality of colors.

The control circuit 38 provide control for transmitting binary dot patterns corresponding to colors, which patterns are obtained by converting color image information of red, blue, green, pink, yellow, and purple, and for transmitting image information of a list of binary patterns corresponding to colors detected in each page and the detected color names while adding the list to a blank portion of the corresponding page. Note that the control circuit 38 utilizes an internal page counter CT and an internal register R upon execution of such control.

A transmission process for color image information by the control circuit 38 will be described below with reference to the flow charts of FIGS. 3 and 4.

Figure 3:
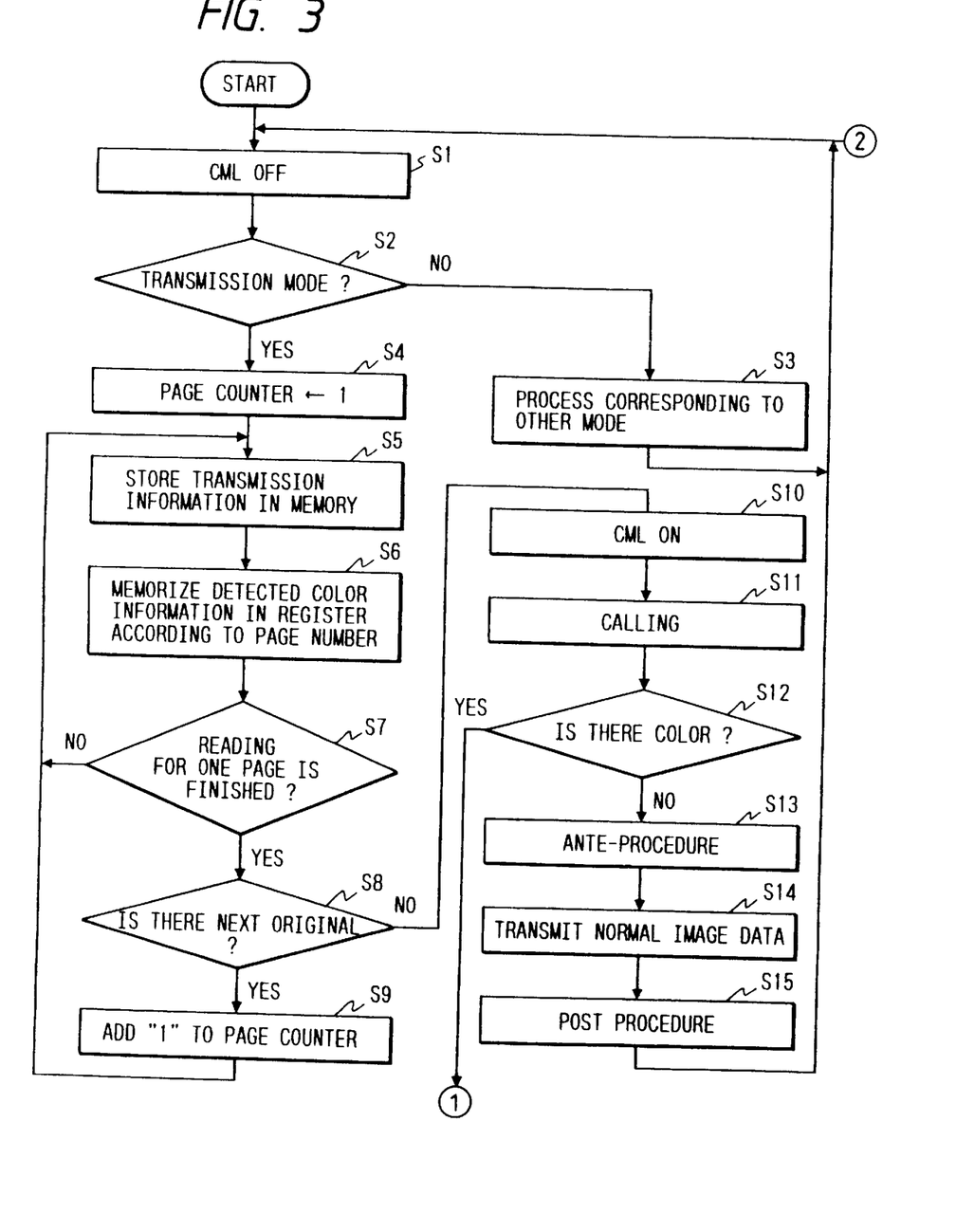
FIG. 3 is a flow chart showing a transmission process for a color image.
Figure 4:
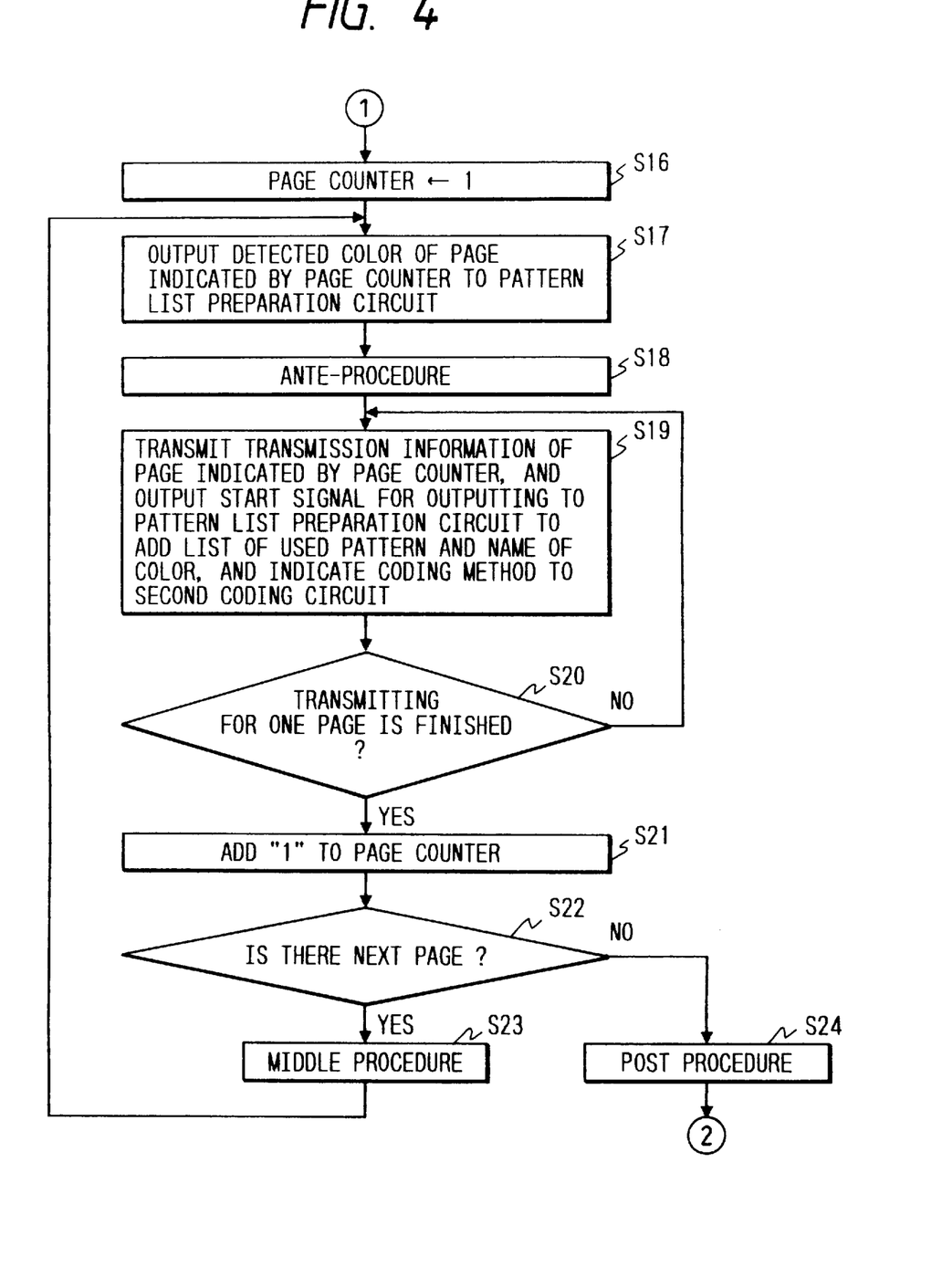
FIG. 4 is a flow chart showing the transmission process for a color image.

The control circuit 38 outputs a "0"-level signal onto the signal line 38a to connect the telephone line 2a to the telephone set 4 via line 2b, thereby turning off CML (step S1 in FIG. 3). It is then determined whether or not a transmission mode is set by a predetermined switch (not shown) (step S2). If NO in step S2, the control circuit 38 executes a process corresponding to another mode (step S3), and the flow returns to step S1.

On the other hand, if YES in step S2, the control circuit 38 sets an initial value of "1" in the page counter CT (step S4). The control circuit 38 controls the signal output on the signal lines 38c and 38d to store image data for one line read by the reading circuit 10 in the memory circuit 16 (step S5). In this case, of the image data stored in the memory circuit 16, images corresponding to colors are converted into black/white binary patterns by the pattern conversion circuit 12. The control circuit 38 receives detected color signals from the pattern conversion circuit 12.

The control circuit 38 then stores the input color signals in its register R in correspondence with the page No. in its page counter CT (step S6). In this case, if the same color signal as a signal to be stored has already been stored, the control circuit 38 does not repetitively store the signal.

A determination is made whether or not a reading for one page is finished (step S7). If NO in step S7, the flow returns to step S5; otherwise, a determination is made whether or not there is a next original (step S8). If YES in step S8, the page No. in the page counter CT is incremented by one (step S9), and the flow returns to step S5.

However, if NO in step S8, the control circuit 38 outputs a "1"-level signal onto the signal line 38a to connect the telephone line 2a to the facsimile via line 2c, thereby turning on CML (step S10). The control circuit 38 then calls a designated transmission destination (step S11). A determination is made as to whether or not colors are stored in the register R (step S12).

If NO in step S12, this means that all pages of image data stored in the memory circuit 16, which is to be transmitted, consist of black/white image data alone, normal transmission is performed. More specifically, ante-procedure signals are transmitted and received (step S13), normal binary image data is transmitted (step S14), and post-procedure signals are transmitted and received (step S15). Then, the flow returns to step S1. In the normal transmission process, the control circuit 38 does not perform output start control for the pattern list preparation circuit 20, as a matter of course.

On the other hand, if colors are stored in the register R, this means that image data to be transmitted, which image data is stored in the memory circuit 16, includes color image data. In this case, the control circuit 38 sets an initial value "1" in the page counter CT (step S16 in FIG. 4). Then, the color signals in the register R corresponding to the page No. in the page counter CT are output to the pattern list preparation circuit 20 via the signal line 38e (step S17). Thus, the pattern list preparation circuit 20 prepares image information and the color names of a list of patterns corresponding to colors converted and used in the page indicated by the page counter CT.

The control circuit 38 transmits and receives ante-procedure signals via the signal lines 38b and 30a (step S18). The control circuit 38 reads out image data for a page indicated by the page counter CT, and transmits the read out image data (step S19). In step S19, the control circuit 38 outputs a start signal for outputting to the pattern list preparation circuit 20 via the signal line 38f, so that the list information of patterns corresponding to colors and the color names is input to the addition circuit 22 in synchronism with input of image data of a blank portion from the first decoding circuit 18 to the addition circuit 22. Thus, the addition circuit 22 adds the list of black/white binary pattern used in a page indicated by the page counter CT, and the corresponding color names to the blank portion of the page. Also, the control circuit 38 instructs a coding method to the second coding circuit 24 via the signal line 38g, and also instructs reduction or line density conversion corresponding to the size of a recording sheet in a transmission destination to the second coding circuit 24 via the signal line 38g.

Figure 5:
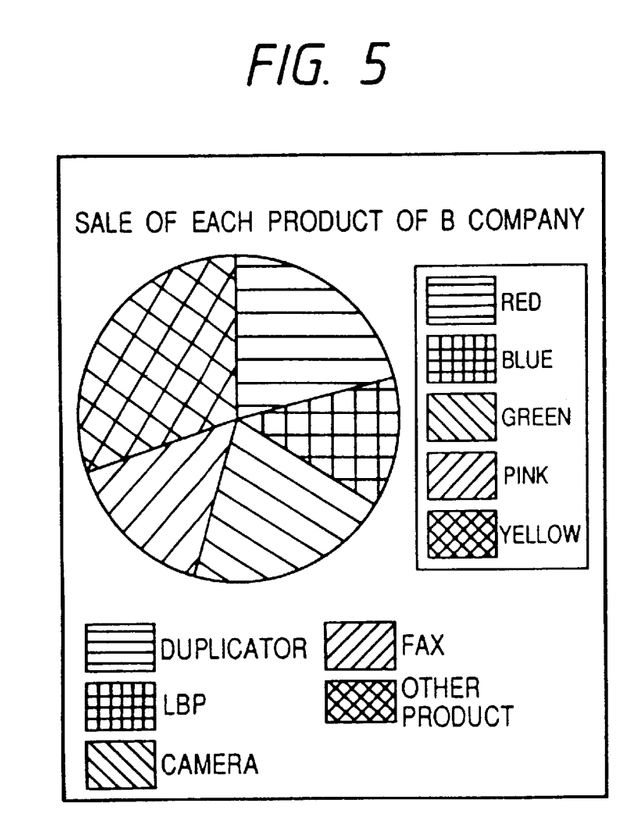
FIG. 5 is a graph showing an image obtained by converting color images shown in FIG. 8 into corresponding black/white binary patterns.
Figure 6:
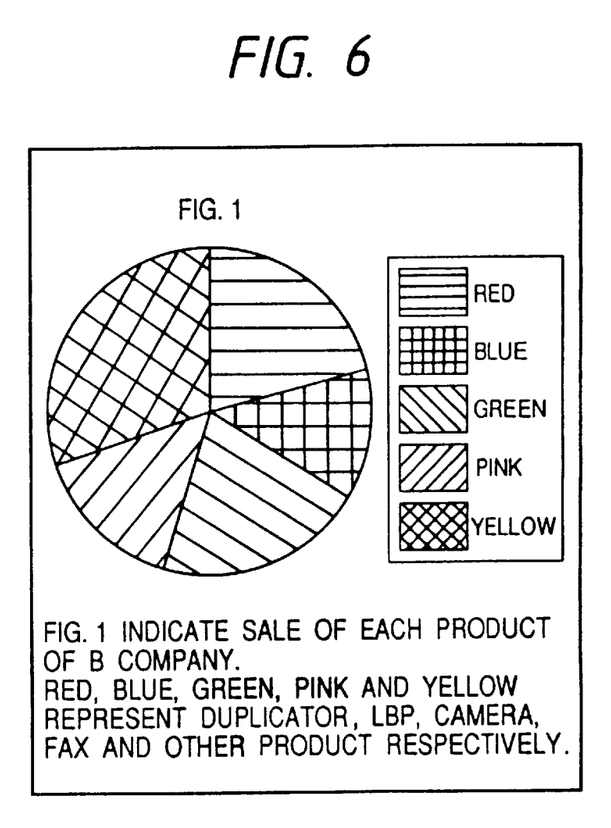
FIG. 6 is a graph showing an image obtained by converting color images shown in FIG. 11 into corresponding black/white binary patterns.
Figure 7:
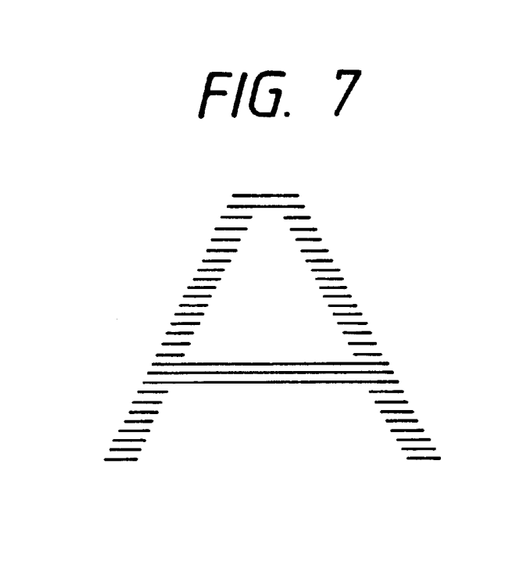
FIG. 7 is a diagram showing a state wherein a color character "A" is converted into a corresponding black/white binary pattern.

With this transmission process, two pieces of color image information shown in FIGS. 8 and 11 are respectively recorded as black/white binary patterns by a receiving apparatus, as shown in FIGS. 5 and 6. Note that the two pieces of color image information shown in FIGS. 8 and 11 are so-called solid-printed color images. For example, color information representing a character "A" printed in red is similarly recorded as a black/white binary pattern, as shown in FIG. 7.

Upon completion of the process in step S19, a determination is made whether or not transmission of image data for one page is finished (step S20). If NO in step S20, the flow returns to step S19. On the other hand, if YES in step S20, the page No. in the page counter CT is incremented by one (step S21), and a determination is made whether or not transmission of all pages of image data in the memory circuit 16 is finished (step S22). If NO in step S22, the flow returns to step S17 to repeat the same process as described above. On the other hand, if YES in step S22, the control circuit 38 transmits and receives post-procedure signals via the signal lines 38b and 30a (step S24), and the flow then returns to step S1.

In this embodiment, six colors, i.e., red, blue, green, pink, yellow, and purple are used as colors, and these pieces of color image information are converted into predetermined binary pattern information corresponding to the colors, and the binary information is transmitted. However, the colors to be converted into binary information of patterns are not limited to the above-mentioned six colors.

When colors which can be read by a transmitting apparatus include a color which can be recorded by a receiving apparatus, color information itself of the color itself may be encoded and transmitted. In this case, it is hard to check a coincidence between readable colors of a transmitting apparatus and recordable colors of a receiving apparatus, and to set colors to be transmitted as color information and colors to be transmitted as converted binary pattern information in each transmission. Thus, recordable colors of the recording apparatus are registered in advance in correspondence with address information such as a FAX number, and colors to be transmitted as color information and colors to be transmitted as converted binary pattern information can be automatically discriminated on the basis of the registration content, thus improving a user's convenience.

When the list of patterns corresponding to colors and the color names is added to a blank area of a recording sheet, the size of the list information may be determined in accordance with the size of the blank area.

In the above embodiment, the reduction or line density conversion process of transmission data according to the recording sheet size of a transmission destination is performed by the second coding circuit 24, however it may also be performed by the first decoding circuit 18.

If it is determined that original image information to be transmitted includes the same or similar pattern as or to that used for conversion, the pattern can be inhibited from being used in conversion. In this case, a pattern of another color which is not the same as or similar to the pattern included in original image information and is not used in conversion can be alternately used (in this case, the corresponding color name is also changed, as a matter of course). In order to avoid the appearance of the same or a similar pattern as much as possible, a plurality of patterns may be assigned to each color, and a pattern which is not the same as or similar to the pattern included in original image information may be selected and used.

In the above embodiment, the list of patterns used in a page and the corresponding color names is added in units of pages. Alternatively, the list of patterns used within a range of all pages to be transmitted, and the corresponding color names may be collectively added to a blank portion of a predetermined page (e.g., the final page).

Also, the list of patterns used within a range of all pages to be transmitted, and the corresponding color names may be transmitted as a new page separate from pages of original information to be transmitted.

The reading circuit 10 may read original information while color-separating it into three color components, i.e., red, green, and blue, and the colors of images on an original may be determined on the basis of these three color components.

The present invention can also be applied to a duplicator or a printer for converting color information into patterns.

As described above, image information of a color, which can not be recorded by a receiving apparatus, can be transmitted in a format, which can be correctly recognized by the receiving apparatus.

What is claimed is:

1. An image transmitting method comprising the steps of:
    discriminating colors which are recordable at a receiving side and colors which are not recordable at the receiving side; and
    transmitting color image information as to the colors which are recordable at the receiving side and monochrome pattern image information as to the colors which are not recordable at the receiving side in accordance with the discriminating result when a color image is to be transmitted to the receiving side.

2. A method according to claim 1, wherein said color image information is encoded, and wherein said monochrome pattern image information is binary.

3. A method according to claim 1, further comprising a step of reading the color image which is to be transmitted to the receiving side.

4. A method according to claim 1, wherein in said transmitting step the monochrome pattern image information of patterns corresponding to the colors is transmitted.

5. An image processing method comprising the steps of:
    discriminating colors which are reproducible in an image reproducing apparatus and colors which are not reproducible in the image reproducing apparatus;
    outputting color image information as to the colors which are reproducible in the image reproducing apparatus and monochrome pattern image information as to the colors which are not reproducible in the image reproducing apparatus in accordance with the discriminating results; and
    causing the image reproducing apparatus to reproduce color images corresponding to the output color image information and to reproduce monochrome pattern images corresponding to the output monochrome pattern image information.

6. A method according to claim 5, wherein in said outputting step the monochrome pattern image information representing a plurality of patterns corresponding to the plurality of different colors is output.

7. A method according to claim 5, further comprising:
    a step of reading the color image which is to be reproduced by the image reproducing apparatus.

8. An image transmitting apparatus comprising:
    discriminating means for discriminating colors which are recordable at a receiving side and colors which are not recordable at the receiving side; and
    transmitting means for transmitting color image information as to the colors which are recordable at the receiving side and monochrome pattern image information as to the colors which are not recordable at the receiving side in accordance with the discriminating result when a color image is to be transmitted to the receiving side.

9. An apparatus according to claim 8, wherein said color image information is encoded, and wherein said monochrome pattern image information is binary.

10. An apparatus according to claim 8, further comprising reading means for reading the color image which is to be transmitted to the receiving side.

11. An apparatus according to claim 8, wherein the monochrome pattern image information of patterns corresponding to the colors is transmitted by said transmitting means.

* * * * *

UNITED STATES PATENT AND TRADEMARK OFFICE
CERTIFICATE OF CORRECTION

PATENT NO.    : 6,008,913
DATED         : December 28, 1999
INVENTOR(S)   : TAKEHIRO YOSHIDA It is certified that error appears in the above-identified patent and that said Letters Patent is hereby corrected as shown below:

COLUMN 4

Line 61, "provide" should read --provides--.

COLUMN 6

Line 48, "itself" (first occurrence) should be deleted.

Signed and Sealed this

Twenty-third Day of January, 2001

Attest:

Q. TODD DICKINSON

Attesting Officer

Commissioner of Patents and Trademarks